(12) United States Patent
Lipcsei et al.

(10) Patent No.: US 8,058,817 B2
(45) Date of Patent: Nov. 15, 2011

(54) POWER SYSTEMS WITH CURRENT REGULATION

(75) Inventors: Laszlo Lipcsei, Campbell, CA (US); Serban-Mihai Popescu, San Carlos, CA (US); Sorin Hornet, Milpitas, CA (US)

(73) Assignee: O2Micro, Inc., Santa Clara, CA (US)

( * ) Notice: Subject to any disclaimer, the term of this patent is extended or adjusted under 35 U.S.C. 154(b) by 429 days.

(21) Appl. No.: 12/286,392

(22) Filed: Sep. 30, 2008

(65) Prior Publication Data

US 2010/0079088 A1  Apr. 1, 2010

(51) Int. Cl.
G05F 1/00 (2006.01)
H05B 37/02 (2006.01)
H05B 39/04 (2006.01)
H05B 41/36 (2006.01)

(52) U.S. Cl. .............. 315/297; 315/209 R; 315/291; 315/307

(58) Field of Classification Search .................. None
See application file for complete search history.

(56) References Cited

U.S. PATENT DOCUMENTS

| | | | |
|---|---|---|---|
| 5,703,439 A * | 12/1997 | Nerone | 315/209 R |
| 7,304,464 B2 | 12/2007 | Weng et al. | |
| 7,728,798 B2 * | 6/2010 | Kim | 345/82 |
| 2006/0158136 A1 | 7/2006 | Chen | |
| 2008/0290811 A1* | 11/2008 | Yoshida | 315/225 |
| 2010/0033109 A1* | 2/2010 | Liu et al. | 315/294 |

FOREIGN PATENT DOCUMENTS

CN  1808875 A   7/2006
CN  101039070 A  9/2007

* cited by examiner

*Primary Examiner* — Anh Tran

(57) ABSTRACT

A power system includes a current regulator coupled to a load and for generating an output current having a substantially constant ripple magnitude, and for adjusting the output current according to a sense signal indicative of the output current. In addition, the power system includes a filter element coupled in parallel with the load and for passing an AC (alternating-current) portion of the output current. Furthermore, the power system includes a current sensor coupled between ground and the parallel-coupled filtering element and load, and for providing the sense signal indicative of the output current.

28 Claims, 4 Drawing Sheets

```
                    400
```

```
┌─────────────────────────────────────────────────────┐
│  GENERATING A CURRENT HAVING A SUBSTANTIALLY        │
│           CONSTANT RIPPLE MAGNITUDE                 │
│                      402                            │
└─────────────────────────────────────────────────────┘
                         ↓
┌─────────────────────────────────────────────────────┐
│  PASSING AN ALTERNATING-CURRENT PORTION OF THE      │
│   CURRENT BY A FILTER ELEMENT COUPLED IN            │
│              PARALLEL WITH A LOAD                   │
│                      404                            │
└─────────────────────────────────────────────────────┘
                         ↓
┌─────────────────────────────────────────────────────┐
│   BLOCKING A DIRECT-CURRENT PORTION OF THE          │
│      CURRENT BY THE FILTER ELEMENT                  │
│                      406                            │
└─────────────────────────────────────────────────────┘
                         ↓
┌─────────────────────────────────────────────────────┐
│  PROVIDING A SENSE SIGNAL INDICATIVE OF THE         │
│ CURRENT BY A CURRENT SENSOR COUPLED BETWEEN         │
│  GROUND AND THE PARALLEL-COUPLED FILTER             │
│              ELEMENT AND LOAD                       │
│                      408                            │
└─────────────────────────────────────────────────────┘
                         ↓
┌─────────────────────────────────────────────────────┐
│ ADJUSTING THE CURRENT BASED ON A COMPARISON         │
│ BETWEEN A PREDETERMINED REFERENCE SIGNAL AND        │
│              THE SENSE SIGNAL                       │
│                      410                            │
└─────────────────────────────────────────────────────┘
```

FIG. 4 a
POWER SYSTEMS WITH CURRENT REGULATION

TECHNICAL FIELD

Embodiments in accordance with the present invention relate to power systems with current regulation.

BACKGROUND ART

Currently, light sources such as LEDs (light emitting diodes) can be used in many applications, such as traffic lights, backlight for LCD (liquid crystal display) TVs, computer monitors, etc. In conventional LED driven systems, linear regulators can be used to drive the LEDs. However, a considerate amount of power may be dissipated on the linear regulators, which may reduce the efficiency of the regulators. In addition, the conventional regulators may not regulate an output current to a desirable level accurately enough.

BRIEF DESCRIPTION OF THE DRAWINGS

The accompanying drawings, which are incorporated in and form a part of this specification, illustrate embodiment of the present invention and, together with the description, serve to explain the principles of the invention:

FIG. 4 illustrates an exemplary flowchart of operations performed by a power system, in accordance with one embodiment of the present invention.

SUMMARY

Figure 1:
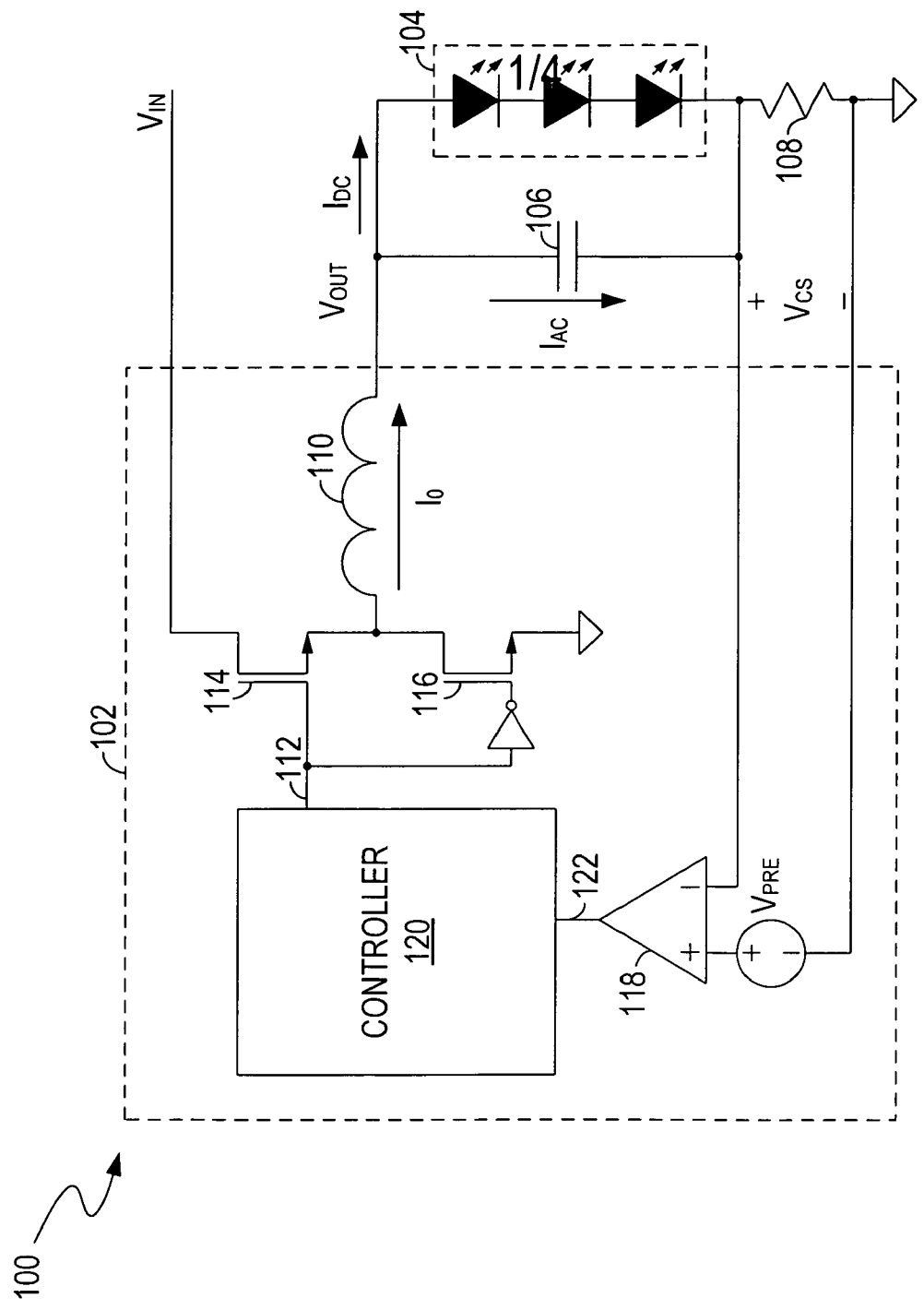
FIG. 1 illustrates an exemplary block diagram of a power system, in accordance with one embodiment of the present invention.

In one embodiment, a power system includes a current regulator coupled to a load and for generating an output current having a substantially constant ripple magnitude, and for adjusting the output current according to a sense signal indicative of the output current. In addition, the power system includes a filter element coupled in parallel with the load and for passing an AC (alternating-current) portion of the output current. Furthermore, the power system includes a current sensor coupled between ground and the parallel-coupled filtering element and load, and for providing the sense signal indicative of the output current.

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

In one embodiment, the present invention provides a power system for powering a load. Since the power system in the present invention employs a switching regulator, the power consumption can be reduced. In one such embodiment, the power system can generate an output current having a substantially constant ripple current, and adjust a DC (direct current) level of the output current to a proper level to power the load. The output current can be controlled/adjusted by comparing a sense signal with a reference signal by a controller. In one embodiment, the sense signal indicating both AC (alternating current) level and DC level of the output current is feedback to the controller for output current control. As such, the output current (e.g., the DC level and/or the AC level of the output current) can be controlled in a relatively accurate way. In addition, the sense signal can be a voltage signal with respect to ground, and the voltage level of the sense signal can be relatively low, which can further decrease power consumption of the power system.

In one embodiment, the present invention also provides an exemplary display system. In one such embodiment, the aforementioned power system can be used to power a set of light sources (e., a red-light emitting diode, a green-light emitting diode and a blue-light emitting diode) in the display system. In addition, an intensity controller can be used to control an intensity of light emitted from each light source, so as to control a hue of the color mixed by the lights emitted from the set of light sources.

FIG. 1 illustrates an exemplary block diagram of a power system 100, in accordance with one embodiment of the present invention. In one embodiment, the power system 100 includes a current regulator 102 (e.g., a switching regulator) coupled to a load 104. The current regulator 102 can receive an input voltage $V_{IN}$ and generate an output current 10 having a substantially constant ripple magnitude, and adjust the output current lo according to a sense signal (e.g., a voltage signal $V_{CS}$ shown in FIG. 1) indicative of the output current $I_O$. More specifically, the current regulator 102 can adjust the output current $I_O$ by comparing a predetermined reference signal (e.g., a reference voltage $V_{PRE}$ shown in FIG. 1) with the sense signal $V_{CS}$. The power system 100 can also include a filter element 106 (e.g., a capacitor) coupled in parallel with the load 104 and for passing an AC portion $I_{AC}$ of the output current $I_O$, and for blocking a DC portion $I_{DC}$ of the output current $I_O$. In addition, the power system 100 can include a current sensor 108 coupled between ground and the parallel-coupled filtering element 106 and load 104, and for providing the sense signal $V_{CS}$.

More specifically, the current regulator 102 can include a comparator 118 for comparing the sense signal $V_{CS}$ with the predetermined reference signal $V_{PRE}$ and for generating a control signal 122 according to a result of the comparison. The current regulator 102 can further includes a controller 120 (e.g., a constant ripple current controller) coupled to the comparator 118 and for generating a PWM (pulse width modulation) signal 112 based on the control signal 122 to control the output current $I_O$. For example, the constant ripple current controller 120 can generate a PWM signal having a first state (e.g., high) for a time period $T_{ON}$ and having a second state (e.g., low) for a time period $T_{OFF}$. $T_{ON}$ can be inversely proportional to a difference between a signal $S_{IN}$ representative of the input voltage $V_{IN}$ of the current regulator 102 and a signal $S_{OUT}$ representative of an output voltage $V_{OUT}$ of the current regulator 102. $T_{OFF}$ can be inversely proportional to $S_{OUT}$. In another embodiment, the comparator 118 can be included in the controller 120.

In one embodiment, the PWM signal 112 controls a high-side switch 114 coupled between the input voltage source $V_{IN}$ and an inductor 110, and controls a low-side switch 116 coupled between the inductor 110 and ground.

In the example of FIG. 1, the comparator 118 coupled to the resistor 108 is operable for receiving the sense signal $V_{CS}$ and the predetermined reference signal $V_{PRE}$. In one embodiment, the current sensor 108 can be a resistor for passing the current $I_0$ and for generating the sense signal $V_{CS}$ indicative of the output current $I_0$ (e.g., $V_{CS}$ is equal to the current $I_0$ multiplied by a resistance $R_{CS}$ of the resistor 108, $V_{CS}=I_0*R_{CS}$). The comparator 118 can generate a control signal 122 according to a comparison result of the sense signal $V_{CS}$ and the predetermined reference signal $V_{PRE}$.

As described above, the controller 120 can be a CRC (constant ripple current) controller. For example, when the signal $V_{CS}$ decreases to the signal $V_{PRE}$, the control signal 122 can control the controller 120 to generate a high PWM signal 112 to turn on switch 114 and turn off switch 116 so as to increase the current $I_0$. In addition, a time period $T_{ON}$ when the PWM signal 112 is high can be controlled by the controller 120, and the controller 120 can generate a low PWM signal 112 after the time period $T_{ON}$ expires. During the time period $T_{OFF}$ when the PWM signal 112 is low, switch 114 is turned off and switch 116 is turned on, such that the current $I_0$ starts to decrease, and so does the sense signal $V_{CS}$. Thus, the controller 120 can adjust the duty cycle of the PWM signal 112 (e.g., by controlling the time period $T_{ON}$) such that the current $I_0$ can be no less than the current value $V_{PRE}/R_{CS}$ and have a ripple magnitude $\Delta I_0$. In one embodiment, the controller 120 can control the duty cycle of the PWM signal 112 so as to maintain the ripple magnitude $\Delta I_0$ substantially constant. The ripple magnitude $\Delta I_0$ can vary but within a range such that an equivalent current level $I_{EQV}$ of the current $I_0$ can be relatively stable.

Figure 2:
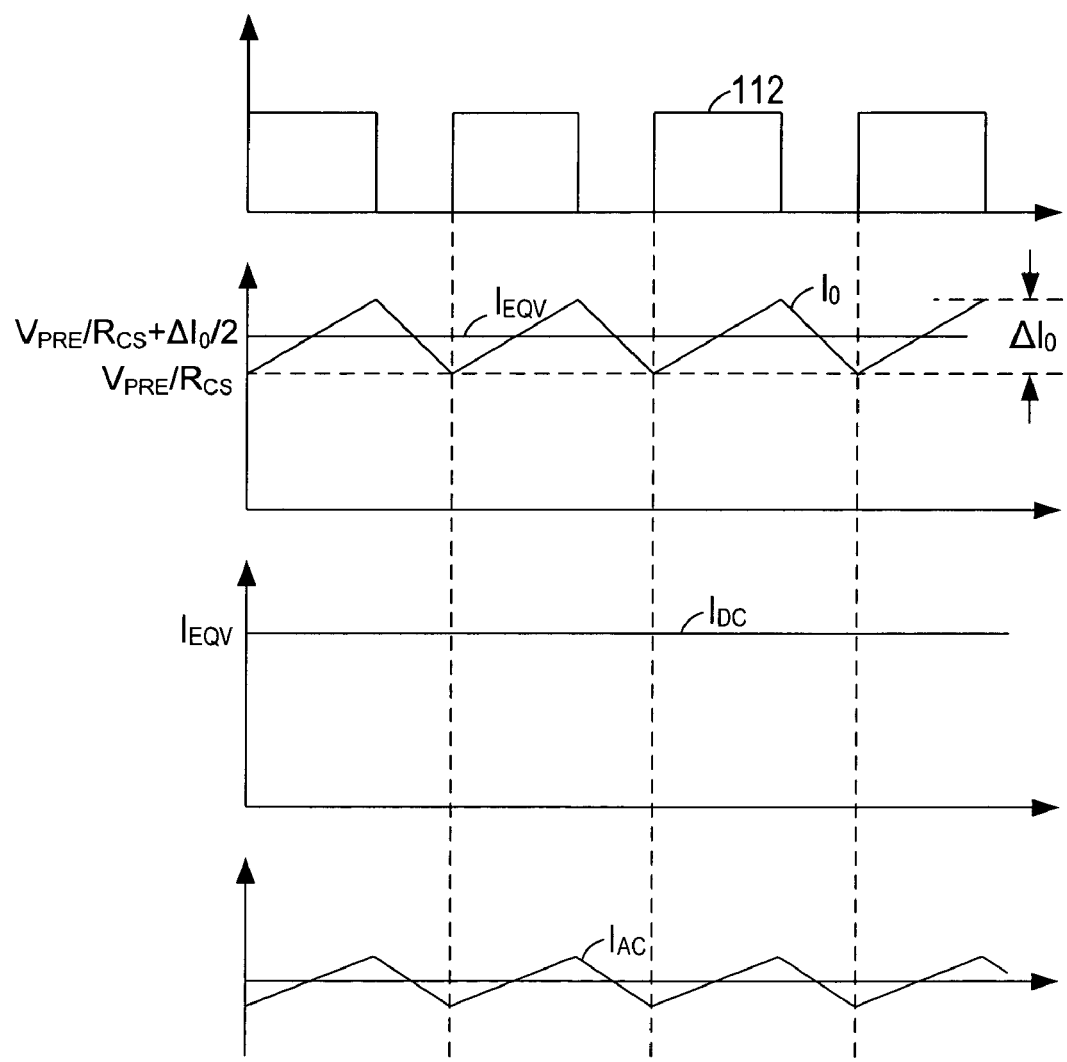
FIG. 2 illustrates an exemplary plot for an output current generated by the power system, in accordance with one embodiment of the present invention.

An exemplary plot 200 for the output current $I_0$ is illustrated in FIG. 2, in accordance with one embodiment of the present invention. FIG. 2 is described in combination with FIG. 1. As shown in the example of FIG. 2, a high state of the PWM signal 112 can be triggered when the output current $I_0$ decreases to the current level $V_{PRE}/R_{CS}$. The ripple magnitude $\Delta I_0$ can be substantially constant. Additionally, the waveform of the output current $I_0$ can be a sawtooth waveform as depicted in FIG. 2. As such, the equivalent current level $I_{EQV}$ of the current $I_0$ can be given by:

$$I_{EQV}=V_{PRE}/R_{CS}+\Delta I_0/2. \quad (1)$$

The load 104 in FIG. 1 can include one or more LEDs (light emitting diodes), e.g., an LED string. The filter element 106 in FIG. 1 can be a capacitor. The current $I_0$ can include an AC $I_{AC}$ flowing through the capacitor 106 and a substantial DC $I_{DC}$ flowing through the LEDs 104. If the waveform of the current $I_0$ is a sawtooth, the AC portion $I_{AC}$ of $I_0$ can also have a sawtooth waveform as depicted in FIG. 2. In addition, in one embodiment, the level of the current $I_{DC}$ flowing through the LEDs 104 can be equal to the equivalent current level $I_{EQV}$ of the current $I_0$, for example:

$$I_{DC}=I_{EQV}=V_{PRE}/R_{CS}+\Delta I_0/2. \quad (2)$$

Since the ripple magnitude $\Delta I_0$ can be substantially constant, the current $I_{DC}$ can be relatively stable to drive the LEDs 104 with a desirable light intensity. In one embodiment, the current level $I_{DC}$ of the DC portion can be determined by the predetermined reference signal $V_{PRE}$.

Advantageously, since the current $I_0$ can be regulated by comparing the reference signal $V_{PRE}$ with the sense signal $V_{CS}$ indicative of the both DC and AC levels of the current $I_0$, regulation of the current $I_0$ (e.g., regulation of the level of $I_{DC}$ and/or the level of $I_{AC}$) can be relatively accurate. Furthermore, since the resistor 108 in FIG. 1 is coupled between ground and the parallel-coupled capacitor 106 and LEDs 104 and can have a relatively low resistance $R_{CS}$, the sense signal $V_{CS}$ and the reference signal $V_{PRE}$ can have relatively low voltage levels. As such, the power consumption can be decreased and the system efficiency can be increased, in one embodiment.

Figure 3:
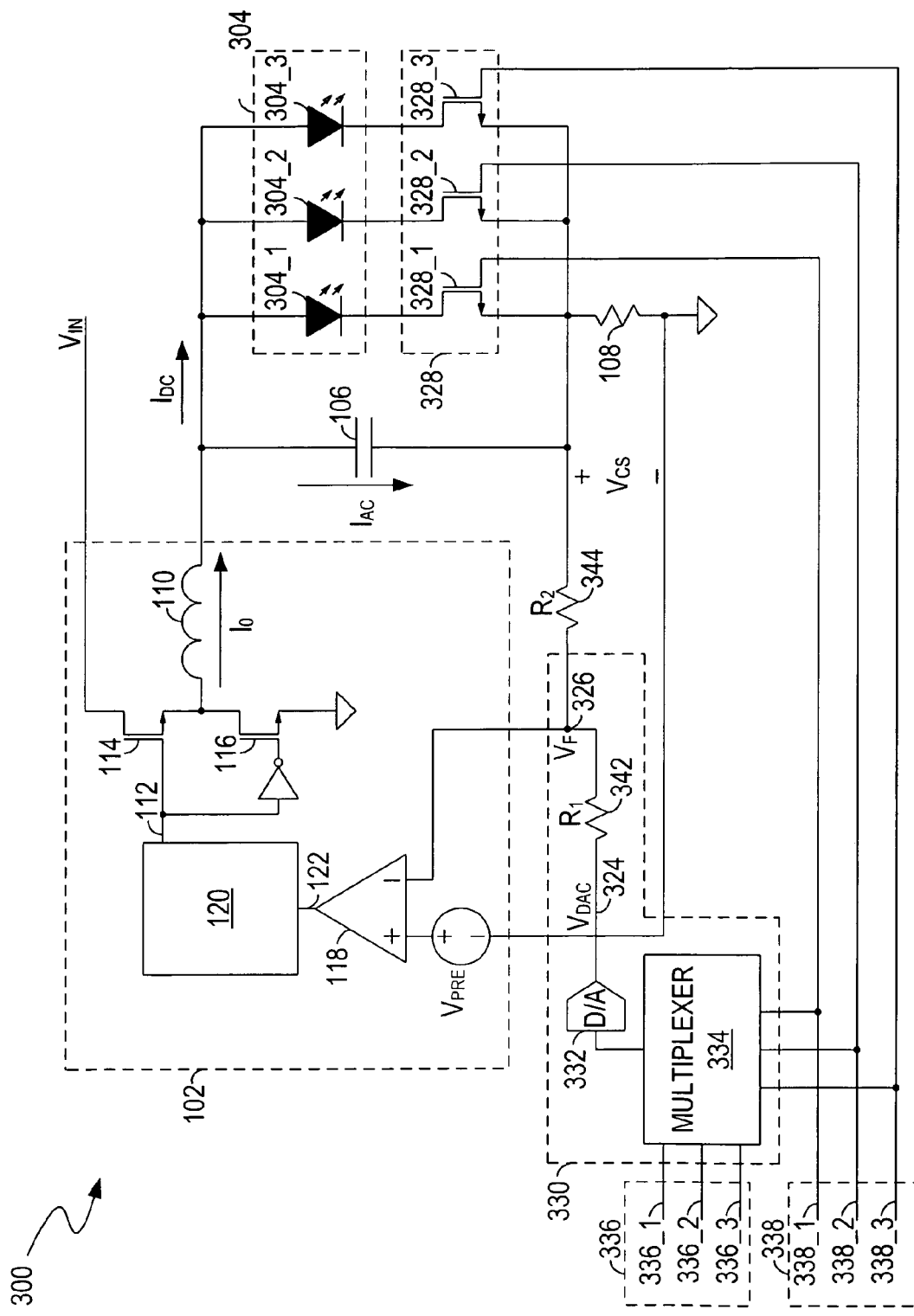
FIG. 3 illustrates an exemplary block diagram of a display system, in accordance with one embodiment of the present invention.

FIG. 3 illustrates an exemplary block diagram of a display system 300, in accordance with one embodiment of the present invention. Elements labeled the same as in FIG. 1 have similar functions and will not be repetitively described herein. As shown in FIG. 3, the display system 300 includes a plurality of light sources 304 for emitting a mixed color. In addition, the display system 300 also includes a current regulator 102 for generating a current Io having a substantially constant ripple magnitude and for adjusting the current 10 based on an adjust signal 324.

Furthermore, the display system 300 includes an intensity controller 330 coupled to the current regulator 102 and for receiving a plurality of intensity control signals 336 and a plurality of select signals 338. The intensity controller 330 can generate the adjust signal 324 based on the intensity control signals 336 and the select signals 338, and control a hue of the mixed color according to the adjust signal 324.

In the example of FIG. 3, the plurality of light sources 304 includes a first LED 304_1 for emitting a red color, a second LED 304_2 for emitting a green color and a third 304_3 LED for emitting a blue color. Correspondingly, the plurality of intensity control signals 336 can include an intensity control signal 336_1 for controlling the current flowing through the first LED 304_1, an intensity control signal 336_2 for controlling the current flowing through the second LED 304_2, and an intensity control signal 336_3 for controlling the current flowing through the third LED 304_3. Each intensity control signal 336-1_336-3 can indicate a predetermined/desirable light intensity of a corresponding LED 304-1_3-4_3. The light sources 304 can include any number of LEDs. In an alternate embodiment, the light sources 304 can include other types of light sources.

In addition, in one such embodiment, a plurality of switches 328_1-328_3 can be respectively coupled to the light sources 304_1-304_3 for allowing a DC portion $I_{DC}$ of the current $I_0$ to flow through a corresponding light source 304_1-304_3 based on the select signals 338_1-338_3. For example, as shown in FIG. 3, the select signal 338_1 can switch on the corresponding switch 328_1 coupled to the light source 304_1, and at the meantime the select signals 338_2-338_3 can switch off the switches 328_2-328_3, so as to allow the DC $I_{DC}$ to flow through the light source 304_1. Light source 304_2 or 304_3 can be controlled in a similar manner.

Furthermore, the select signal 338_1-338_3 can select a corresponding control signal 336_1-336_3 to control the DC $I_{DC}$ flowing through a corresponding light source 304_1-304_3. More specifically, the intensity controller 330 can include a multiplexer 334 for receiving the intensity control signals 336_1-336_3 and the select signals 338_1-338_3, and for outputting a selected intensity control signal of the intensity control signals 336_1-336_3 based on the select signals 338_1-338_3. Each select signal 338_1-338_3 can be a pulse signal. In addition, the select signals 338_1-338_3 can be phases-shifted. For example, when one select signal is high and the other select signals are low, the multiplexer 334 can output a corresponding selected intensity control signal 336_1-336_3, and a corresponding switch 328_1-328_3 can be turned on. As such, the selected intensity control signal 336_1-336_3 can control the DC $I_{DC}$ flowing through the corresponding light source 304_1-304_3 for a time interval $\Delta T'$ during which the corresponding intensity control signal is selected.

In the example of FIG. 3, the intensity control signal 336_1-336_3 can be a digital signal, and the adjust signal 324 can be an analog signal. A D/A (digital-to-analog) converter 332 can be coupled to the multiplexer 334 and convert the selected intensity control signal to the adjust signal. In one embodiment, the adjust signal 324 at the output terminal of the D/A converter 332 can have a voltage level $V_{DAC}$. As shown in FIG. 3, the output terminal of the D/A converter 332 can be coupled to the current regulator 102 at a connection node 326 via a resistor 342. The connection node 326 can be further coupled to the current sensor resistor 108 via a resistor 344. The current sense resistor 108 can provide the sense signal $V_{CS}$. As such, in one embodiment, a feedback signal (e.g., a voltage signal $V_F$ shown in FIG. 3) at the connection node 326 can be determined by the adjust signal 324 indicative of a predetermined light intensity of a corresponding LED 304-1_304_3 and the sense signal $V_{CS}$ indicative of the output current $I_O$. The comparator 118 can compare the feedback signal $V_F$ with the reference signal $V_{PRE}$ so as to control the controller 120 to adjust the output current $I_O$.

In one embodiment, according to the superposition theory, the feedback signal $V_F$ can be given by:

$$V_F = V'_F + V''_F, \qquad (3)$$

where $V'_F$ is a voltage level at the connection node 326 when the voltage level $V_{DAC}$ is assumed to be zero, and $V''_F$ is a voltage level at the connection node 326 when the voltage level $V_{CS}$ is assumed to be zero. If the voltage level $V_{DAC}$ is zero, the voltage $V'_F$ can be given by:

$$V'_F = V_{CS} \times \frac{R_1}{R_1 + R_2}, \qquad (4)$$

where $R_1$ is the resistance of the resistor 342, and $R_2$ is the resistance of the resistor 344. If the voltage level $V_{CS}$ is zero, the voltage $V''_F$ can be given by:

$$V''_F = V_{DAC} \times \frac{R_2}{R_1 + R_2}. \qquad (5)$$

As such, the feedback signal $V_F$ can be given by:

$$V_F = V'_F + V''_F = \frac{V_{CS} \times R_1 + V_{DAC} \times R_2}{R_1 + R_2}. \qquad (6)$$

In one embodiment, when the feedback voltage $V_F$ is equal to the reference voltage $V_{PRE}$, the following equation can be obtained:

$$V_{PRE} = V_F = \frac{V_{CS} \times R_1 + V_{DAC} \times R_2}{R_1 + R_2}. \qquad (7)$$

The equation (7) can be rewritten as:

$$V_{CS} = \frac{V_{PRE} \times (R_1 + R_2) - V_{DAC} \times R_2}{R_1}. \qquad (8)$$

As such, when the feedback voltage $V_F$ is equal to the reference voltage $V_{PRE}$, a current $I_{CS}$ flowing through the sense resistor 108 can be given by:

$$I_{CS} = V_{CS}/R_{CS} = \frac{V_{PRE} \times (R_1 + R_2) - V_{DAC} \times R_2}{R_1 \times R_{CS}}. \qquad (9)$$

In the example of FIG. 3, the feedback signal $V_F$ can be no less than the reference signal $V_{PRE}$, e.g., the current $I_O$ can be controlled no less than the current $I_{CS}$. In addition, the ripple magnitude $\Delta I_O$ of the current $I_O$ can be maintained at substantially constant magnitude. In one embodiment, the waveform of the current $I_O$ can be a sawtooth waveform, such that an equivalent current level $I'_{EQV}$ of the current $I_O$ can be given by:

$$I'_{EQV} = I_{CS} + \Delta I_O/2 = \frac{V_{PRE} \times (R_1 + R_2) - V_{DAC} \times R_2}{R_1 \times R_{CS}} + \Delta I_O/2. \qquad (10)$$

Since the DC portion $I_{DC}$ of the current $I_O$ can be substantially equal to the equivalent current $I'_{EQV}$ of the current $I_O$ as described in relation to FIG. 1 and FIG. 2, $I_{DC}$ can be given by:

$$I_{DC} = I'_{EQV} = \frac{V_{PRE} \times (R_1 + R_2) - V_{DAC} \times R_2}{R_1 \times R_{CS}} + \Delta I_O/2. \qquad (11)$$

As such, the current $I_{DC}$ can decrease when the adjust signal 324 increases, in one embodiment. Accordingly, an intensity of the light emitted from a corresponding light source 304_1-304_3 through which the DC portion $I_{DC}$ flows can be adjusted by the adjust signal 324.

Since the select signals 338_1-338_3 can be phase-shifted, the DC portion $I_{DC}$ of the current $I_O$ can flow through each light source 304_1-304_3 for a time interval sequentially and periodically. In addition, the level of the DC portion $I_{DC}$ flowing through the corresponding light source 304_1-304_3 can be controlled by a corresponding intensity control signal 336_1-336_3. Since the current regulator 102 can be a constant-ripple-current regulator, the DC portion $I_{DC}$ of the current $I_O$ can be regulated at a desirable current level in a relatively accurate and efficient way. Consequently, the plurality of light sources 304_1-304_3 can emit different colors with predetermined/desirable intensities respectively, and the mixed color can have a predetermined/desirable hue determined by the intensity control signals 336_1-336_3.

FIG. 4 illustrates an exemplary flowchart 400 of operations performed by a power system, in accordance with one embodiment of the present invention. FIG. 4 is described in combination with FIG. 1 and FIG. 3.

In block 402, a current generator 102 can generate a current $I_O$ having a substantially constant ripple magnitude $\Delta I_O$.

In blocks 404 and 406, a filter element 106 coupled in parallel with a load 104 can be used to pass an AC portion $I_{AC}$ of the current $I_O$, and to block a DC portion $I_{DC}$ of the current $I_O$. The filter element 106 can be, but is not limit to, a capacitor. The DC portion $I_{DC}$ of the current $I_O$ can be used to power the load 104.

In block 408, a current sensor 108 coupled between ground and the parallel-coupled filter element 106 and load 104 can provide a sense signal $V_{CS}$ (and/or a feedback signal $V_F$) indicative of the current $I_0$.

In block 410, the current generator 102 can adjust the current $I_0$ according to the sense signal $V_{CS}$ (or the feedback signal $V_F$), e.g., by comparing a predetermined reference signal $V_{PRE}$ with the sense signal $V_{CS}$ (or the feedback signal $V_F$). For example, a comparator 118 can be used for comparing the sense signal $V_{CS}$ (or the feedback signal $V_F$) with the predetermined reference signal $V_{PRE}$, and for generating a control signal 122 according to a result of the comparison. Furthermore, a controller 120 can be used for generating a PWM signal 112 based on the control signal 122. The PWM signal 112 can be used to control a high-side switch 114 and a low-side switch 116, so as to adjust the output current $I_0$.

Accordingly, in one embodiment, the present invention provides a power system with constant ripple current regulation. A current regulator in the power system can generate an output current having a substantially constant ripple magnitude base on a current feedback (e.g., a sense/feedback signal indicative of both AC and DC level of the output current), and a DC portion of the output current can be used to power a load (e.g., one or more LEDs). The power system can be implemented in a display system to power a set of light sources (e.g., LEDs including a red LED, a green LED and a blue LED), such that the display system can display a mixed color with a predetermined/desirable hue.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A display system comprising:
   a plurality of light sources for emitting a mixed color;
   an intensity controller coupled to said light sources and operable for receiving a plurality of intensity control signals and a plurality of select signals, selecting a selected intensity control signal of said intensity control signals based on said select signals, and controlling a hue of said mixed color according to said intensity control signals; and
   a current regulator coupled to said intensity controller and said light sources and operable for generating an output current having a substantially constant ripple magnitude to said light sources, and adjusting said output current based on said selected intensity control signal.

2. The display system as claimed in claim 1, wherein each of said select signals comprises a pulse signal.

3. The display system as claimed in claim 1, wherein said select signals are phase-shifted.

4. The display system as claimed in claim 1, further comprising:
   a plurality of switches respectively coupled to said light sources and operable for allowing a DC (direct current) portion of said output current to flow through a light source of said light sources based on said select signals.

5. The display system as claimed in claim 1, wherein said intensity controller comprises a multiplexer operable for receiving said intensity control signals and said select signals, and outputting said selected intensity control signal based on said select signals.

6. The display system as claimed in claim 1, wherein said intensity controller further comprises a digital-to-analog converter operable for converting said selected intensity control signal to an adjust signal to control said output current.

7. The display system as claimed in claim 1, wherein each of said intensity control signals comprises a digital signal.

8. The display system as claimed in claim 1, wherein said selected intensity control signal is converted to an analog signal to control said output current.

9. The display system as claimed in claim 1, wherein said current regulator comprises a comparator operable for comparing a feedback signal with a reference signal, and wherein said feedback signal is determined by said selected intensity control signal and a sense signal indicative of said output current.

10. The display system as claimed in claim 9, wherein said current regulator further comprises a controller coupled to said comparator and operable for generating a PWM (pulse width modulation) signal based on a comparison result of said comparator to control said output current.

11. The display system as claimed in claim 1, further comprising:
    a capacitor coupled in parallel with said plurality of light sources and operable for passing an AC (alternating current) portion of said output current, and for blocking a DC (direct current) portion of said output current; and
    a sense resistor coupled between ground and said parallel-coupled capacitor and light sources, and operable for providing a sense signal indicative of said output current.

12. The display system as claimed in claim 1, wherein said plurality of light sources comprise a first LED (light emitting diode) operable for emitting a red color, a second LED operable for emitting a green color, and a third LED operable for emitting a blue color.

13. The display system as claimed in claim 1, wherein said current regulator controls said output current to have said substantially constant ripple magnitude by controlling a time period to be inversely proportional to a difference between an input voltage of said current regulator and an output voltage of said current regulator.

14. A power system comprising:
    a plurality of terminals operable for providing a plurality of select signals to select a selected light source of a plurality of light sources; and
    control circuitry coupled to said terminals and operable for selecting a selected intensity control signal of a plurality of intensity control signals according to said select signals, generating an output current having a substantially constant ripple magnitude to said selected light source, and controlling said output current according to said selected intensity control signal.

15. The power system as claimed in claim 14, wherein said control circuitry controls said output current to have said substantially constant ripple magnitude by controlling a time period to be inversely proportional to a difference between an input voltage of said control circuitry and an output voltage of said control circuitry.

16. The power system as claimed in claim 14, wherein said select signals are phase-shifted.

17. The power system as claimed in claim 14, further comprising:
a plurality of switches respectively coupled to said light sources and operable for allowing a DC (direct current) portion of said output current to flow through said selected light source.

18. The power system as claimed in claim 14, wherein said intensity controller further comprises a digital-to-analog converter operable for converting said selected intensity control signal to an adjust signal to control said output current.

19. The power system as claimed in claim 14, wherein a hue of a mixed color emitted by said light sources is determined by said intensity control signals.

20. The power system as claimed in claim 14, further comprising:
a comparator operable for comparing a feedback signal with a reference signal, wherein said feedback signal is determined by said selected intensity control signal and a sense signal indicative of said output current.

21. The power system as claimed in claim 20, further comprising:
a controller coupled to said comparator and operable for generating a PWM (pulse width modulation) signal based on a comparison result of said comparator to control said output current.

22. The power system as claimed in claim 14, further comprising:
a capacitor coupled in parallel with said light sources and operable for passing an AC (alternating current) portion of said output current, and blocking a DC (direct current) portion of said output current; and
a sense resistor coupled between ground and said parallel-coupled capacitor and light sources, and operable for providing a sense signal indicative of said output current.

23. A method for powering a plurality of light sources, comprising:
selecting a selected light source of said light sources in response to a plurality of select signals;
selecting a selected intensity control signal of a plurality of intensity control signals according to said select signals;
generating an output current having a substantially constant ripple magnitude to said selected light source; and
controlling said output current according to said selected intensity control signal.

24. The method system as claimed in claim 23, wherein said generating an output current comprises controlling a time period to be inversely proportional to a difference between an input voltage and an output voltage.

25. The method system as claimed in claim 23, wherein said controlling said output current comprises controlling a hue of a mixed color emitted by said light sources according to said intensity control signals.

26. The method system as claimed in claim 23, wherein said controlling said output current comprises comparing a feedback signal with a reference signal, wherein said feedback signal is determined by said selected intensity control signal and a sense signal indicative of said output current.

27. The method system as claimed in claim 26, wherein said controlling said output current further comprises generating a PWM (pulse width modulation) signal based on a result of said comparing to control said output current.

28. The method system as claimed in claim 23, further comprising:
passing an AC (alternating current) portion of said output current using a capacitor coupled in parallel with said light sources;
blocking a DC (direct current) portion of said output current using said capacitor; and
providing a sense signal indicative of said output current using a sense resistor coupled between ground and said parallel-coupled capacitor and light sources.

* * * * *